June 14, 1938.  H. L. BRUMP ET AL  2,120,928
ABRADING AND CUTTING APPARATUS
Filed March 29, 1937  4 Sheets-Sheet 1

INVENTORS
HERBERT L. BRUMP and
ALVAN R. LAMBERT
ATTORNEY

INVENTORS
HERBERT L. BRUMP and
ALVAN R. LAMBERT
ATTORNEY

June 14, 1938. H. L. BRUMP ET AL 2,120,928
ABRADING AND CUTTING APPARATUS
Filed March 29, 1937 4 Sheets-Sheet 3

INVENTORS
HERBERT L. BRUMP and
ALVAN R. LAMBERT
ATTORNEY

Patented June 14, 1938

2,120,928

UNITED STATES PATENT OFFICE 2,120,928

ABRADING AND CUTTING APPARATUS

Herbert L. Brump and Alvan R. Lambert, Dayton, Ohio, said Brump assignor to said Lambert Application March 29, 1937, Serial No. 133,591

22 Claims. (Cl. 51—101)

This invention relates to a device for forming bodies and more particularly to a device for forming bodies of various shapes.

An object of this invention is to provide a device for cutting a body, as for example by a grinding or abrading wheel, wherein the shape of the body is controlled by a shaping device.

Another object of this invention is to provide a device for cutting or grinding a body into a predetermined shape which is similar to or in reverse relation to the shape of the controlling device.

Another object of this invention is to provide a device wherein the relative movement between the grinding device or cutting device and the body is either resiliently controlled or positively controlled.

Another object of this invention is to provide a cam follower for the cam determining the shape of the body, which cam follower is shaped proportional to the contour of the grinding or cutting device.

Another object of this invention is to provide a compensating device for the movement of the carriage for the work, so that as the support for the work moves, a control device moves proportionately.

Another object of this invention is to provide a race pivotally mounted, which race passes through the center of its mounting.

Another object of this invention is to provide a cam for actuating the compensating device compensating for the arcuate path of the cradle.

Another object of this invention is to provide a fulcrum moving with the actuating device for actuating the work towards and away from the shaper mechanism.

Another object of this invention is to provide reversible actuating means having a neutral position.

Other objects and advantages reside in the construction of parts, the combination thereof and the mode of operation, as will become more apparent from the following description.

Fig. 1 discloses a perspective view of the work supporting device without disclosing the grinder.

Figure 4:
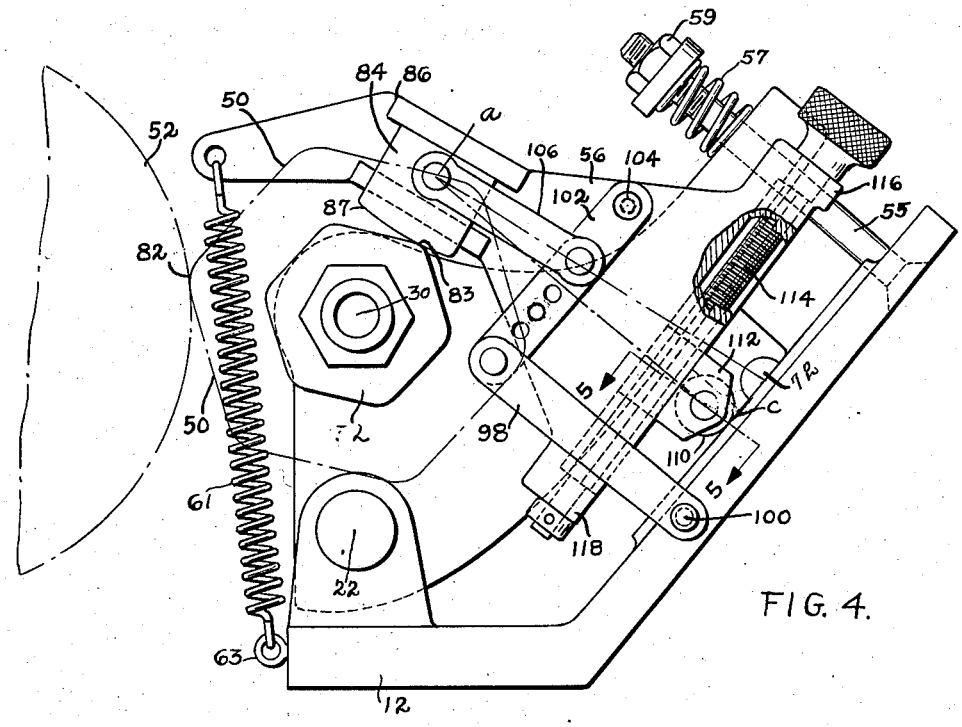
Fig. 4 is a detail end view of a modification disclosing a device for automatically adjusting the cam follower.
Figure 5:
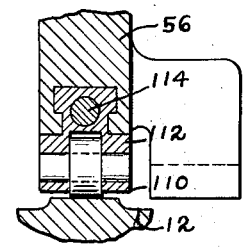

Fig. 5 discloses a fragmentary sectional view taken on the line 5—5 of Fig. 4.

Figure 6:
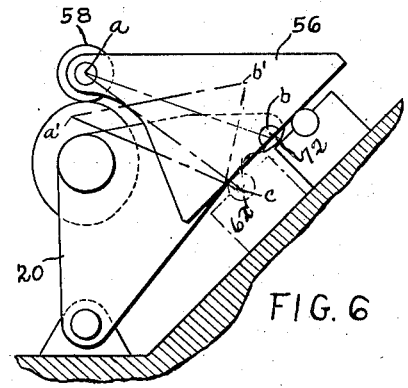

Fig. 6 is a schematic view with parts in section and other parts omitted, disclosing the adjustable fulcrum in two positions.

Figure 7:
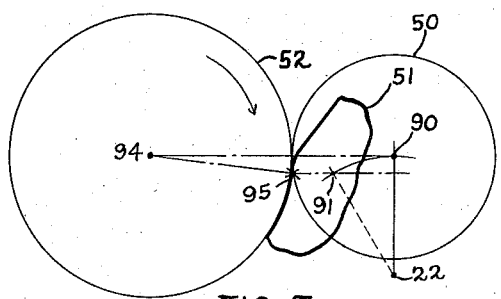

Fig. 7 is a schematic diagram showing the effect of the swinging cradle.

Figure 8:
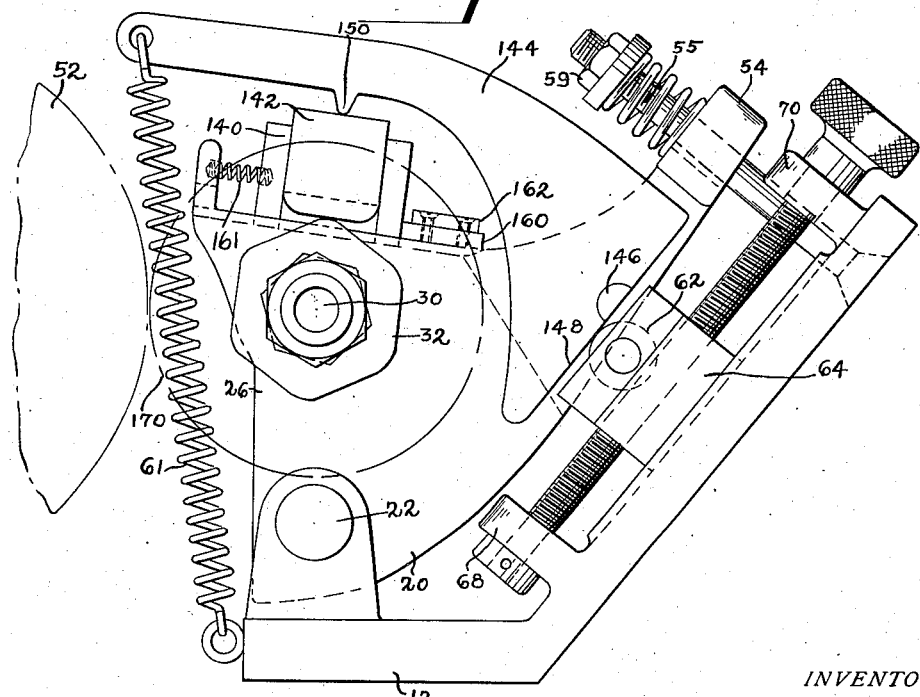

Fig. 8 discloses another modification wherein the cam follower is mounted upon the cradle.

Figure 9:
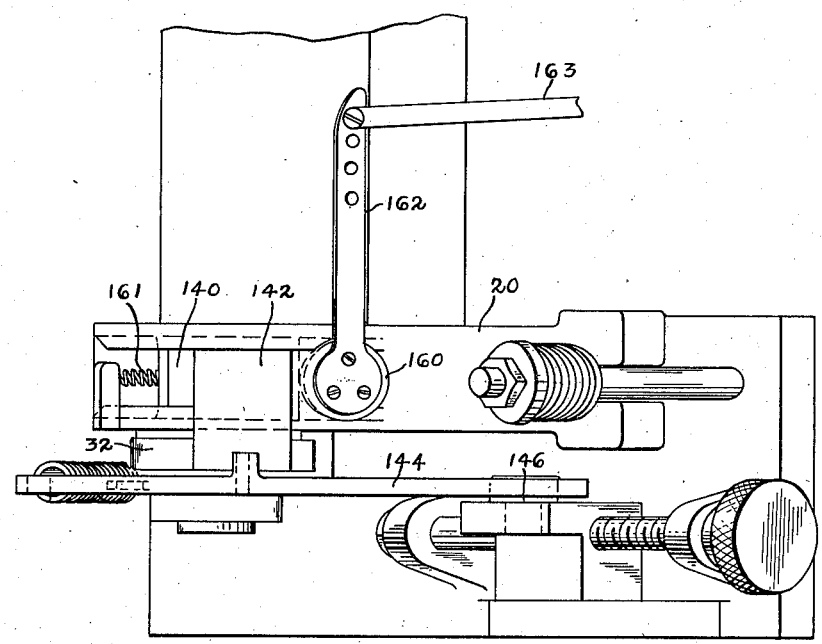

Fig. 9 is a plan view of the modification disclosed in Fig. 8.

Fig. 10 discloses a perspective view of a rocker arm that may be used in several of the modifications.

Fig. 11 discloses a finished work piece.

Fig. 12 is a detail view.

In a patent to Johnston et al. No. 2,037,796 issued April 21, 1936, a cradle for supporting the work in a proper relation with respect to a grinding wheel has been shown. In the device disclosed in the above referred to patent, the work is actuated against the abrading wheel or cutting device positively and the contour of the piston ground or reduced by the device disclosed in the patent is in reverse shape with respect to the cam. That is, the portions of the piston corresponding to the high points on the cam are reduced or ground the deepest. The low points on the cam result in a maximum diameter on the piston.

In the present device, by mounting the fulcrum controlling the movement of the cradle on one side of the pivot between the cradle and the rocker arm, the shape of the body cut or formed is in reverse relation with respect to the shape of the cam, the same as in the above identified patent. By moving the fulcrum to the opposite side of the pivot the shape of the body is proportional and similar to the shape of the cam. Furthermore, the body is then forced against the cutting device by a resilient actuating means rather than by a positive movement. This is very desirable where the material is of such a hardness that the cutting action would be too rapid if the body is fed positively against the cutting device.

Furthermore, when the device is adjusted for producing a shape that is in reverse relation with respect to the cam, it is quite difficult to produce bodies having well defined and abruptly varying contours. For example, if it is desirable to produce a hexagon, the shape of the reverse cam would be such that it would be practically impossible to produce the hexagon body.

The base 10 supports a pair of brackets 12 and 14. These brackets may be attached to the base in any suitable manner as by bolts not shown. A cradle 20 that is provided with a pair of trunnions 22 and 24 is pivotally mounted upon the brackets 12 and 14. The cradle 20 is provided with a headstock 26 and a tailstock 28. The headstock 26 is provided with a bushing for rotatably supporting an actuating spindle 30 supporting a cam 32, which will be more fully described later, and a work supporting head or driving cone 34. The shape of the driving cone 34 is dependent upon the type of work to be cut. The spindle 30 or the cam 32 as shown is provided with a pin 36 eccentrically mounted, adapted for engagement in the slot 38 located between a pair of ears 40 and 42 mounted for rotation with the actuating shaft 44. Any other suitable flexible coupling may be used to interconnect the spindle 30 to the shaft 44, driven from a suitable motor or any other source of power not shown. When the shaft 44 is slid to the left, as viewed in Fig. 1, the pin is seated in the slot 38 between the ears 40 and 42 so as to rotate the pin 36 with the shaft 44. This causes the driving cone 34 to be rotatably driven by the shaft 44. The tailstock 28 supports a center 46 adjustably mounted therein. The center 46 may be adjusted by the tailpiece 48, as is well known to those skilled in the art.

Figure 2:
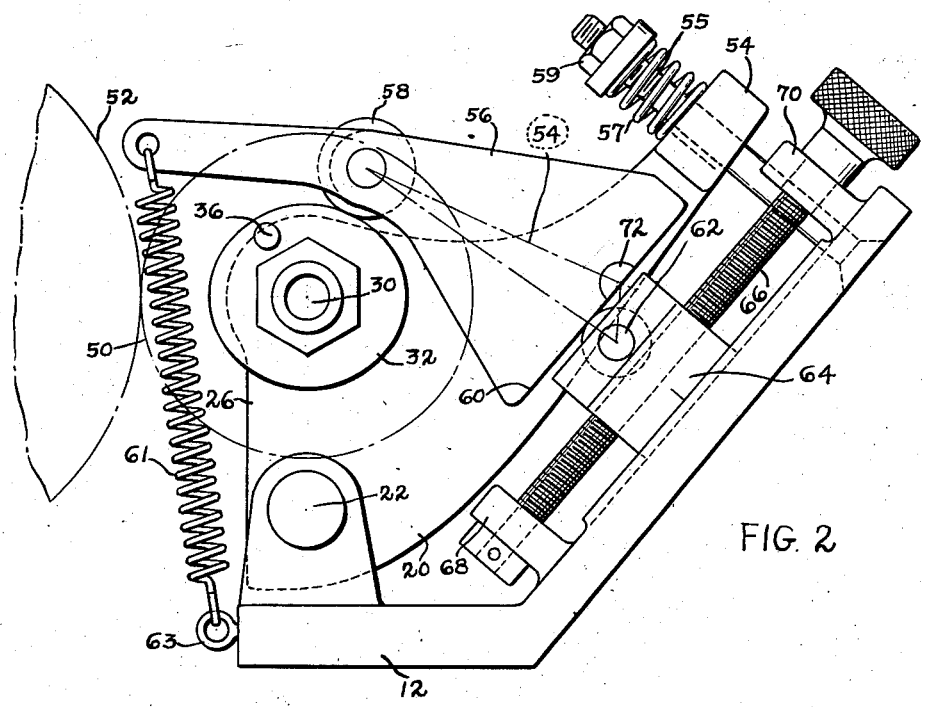
Fig. 2 is an end view of the control device as viewed from the right of Fig. 1.
Figure 3:
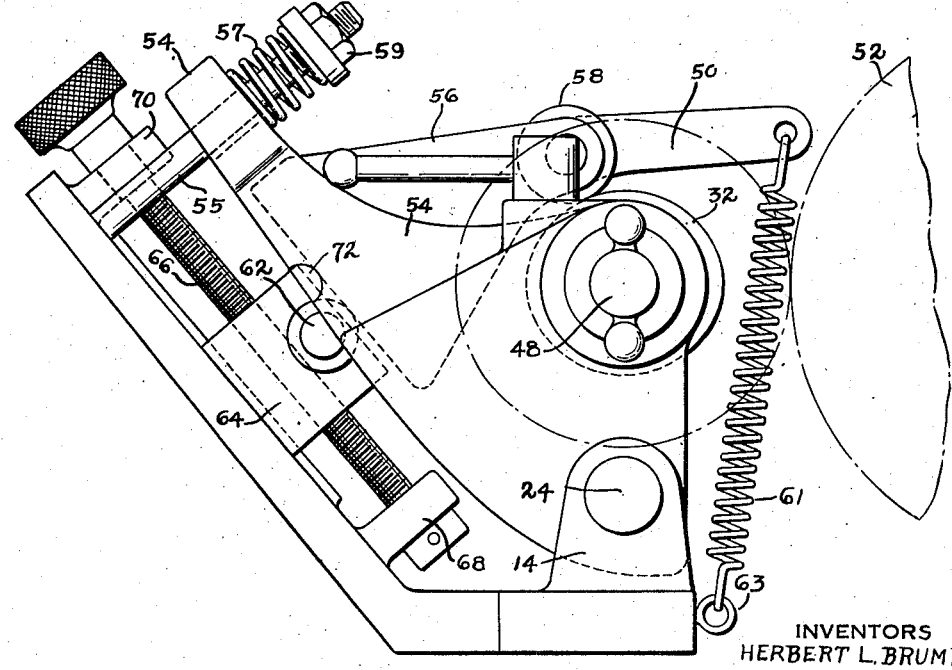
Fig. 3 is another end view looking at the control device from the left of Fig. 1.

By referring to Figs. 2 and 3 the work 50, supported by the driving cone 34 and the center 46 and rotated by the shaft 44, is presented to the grinding wheel 52 by an oscillatory movement of the cradle 20, which movement is produced by the mechanism now to be described.

The headstock 26 which is integral with the cradle 20 is provided with a rearwardly extending extension 54. A bolt 55 mounted into the base portion of the bracket supports a spring 57 which urges the cradle in a clockwise direction, as shown in Fig. 2. The tension of the spring 57 may be adjusted by the nut 59.

The extension 54 also supports a pintle, pivot or journal 72 integral with the rocker arm 56 that is provided with a cam follower 58, riding the cam 32. A tension spring 61 has one end attached to the extreme forward end of the rocker arm 56 and the other end attached to a suitable eye 63 fastened to the bracket 12. The tension spring 61 urges the rocker arm 56 in a counter-clockwise direction, as shown in Fig. 2, causing the cam follower 58 to ride in intimate contact with the cam 32.

A fulcrum roller 62 mounted in the adjustably mounted head 64 engages a straight edge or race 60 extending along the lower side of the rocker arm 56. As the rocker arm 56 is forced against the fulcrum roller 62 by the spring 57, it can be readily seen that the pivot 72 is raised or lowered as the cam follower 58 descends into the reduced portion of the cam 32, or ascends a rise upon the cam. As the pivot 72 is raised or lowered, the cradle swinging about the trunnions 22 and 24 swings the work 50 into the grinding wheel 52 or out of contact therewith, as the case may be.

When the fulcrum roller 62 is located below the pivot 72, as is the case in Figs. 2, 3 and 4, the pivot 72 is raised by the action of the spring 61 whenever the cam follower 58 drops or is lowered in a depression in the cam 32. That is, the spring 61 is the motivating force actuating the work into contact with the grinding wheel 52. The work is moved away from the grinding wheel 52 whenever the cam follower 58 ascends a rise on the cam 32. The spring 57 is then the motivating force.

The fulcrum roller 62, which is mounted in the adjustably mounted head 64, may be actuated upwardly or downwardly by the adjusting screw 66 threadedly engaging the head 64, rotatably mounted but longitudinally fixed in a pair of brackets 68 and 70 carried upon the bracket 12.

Figure 1:
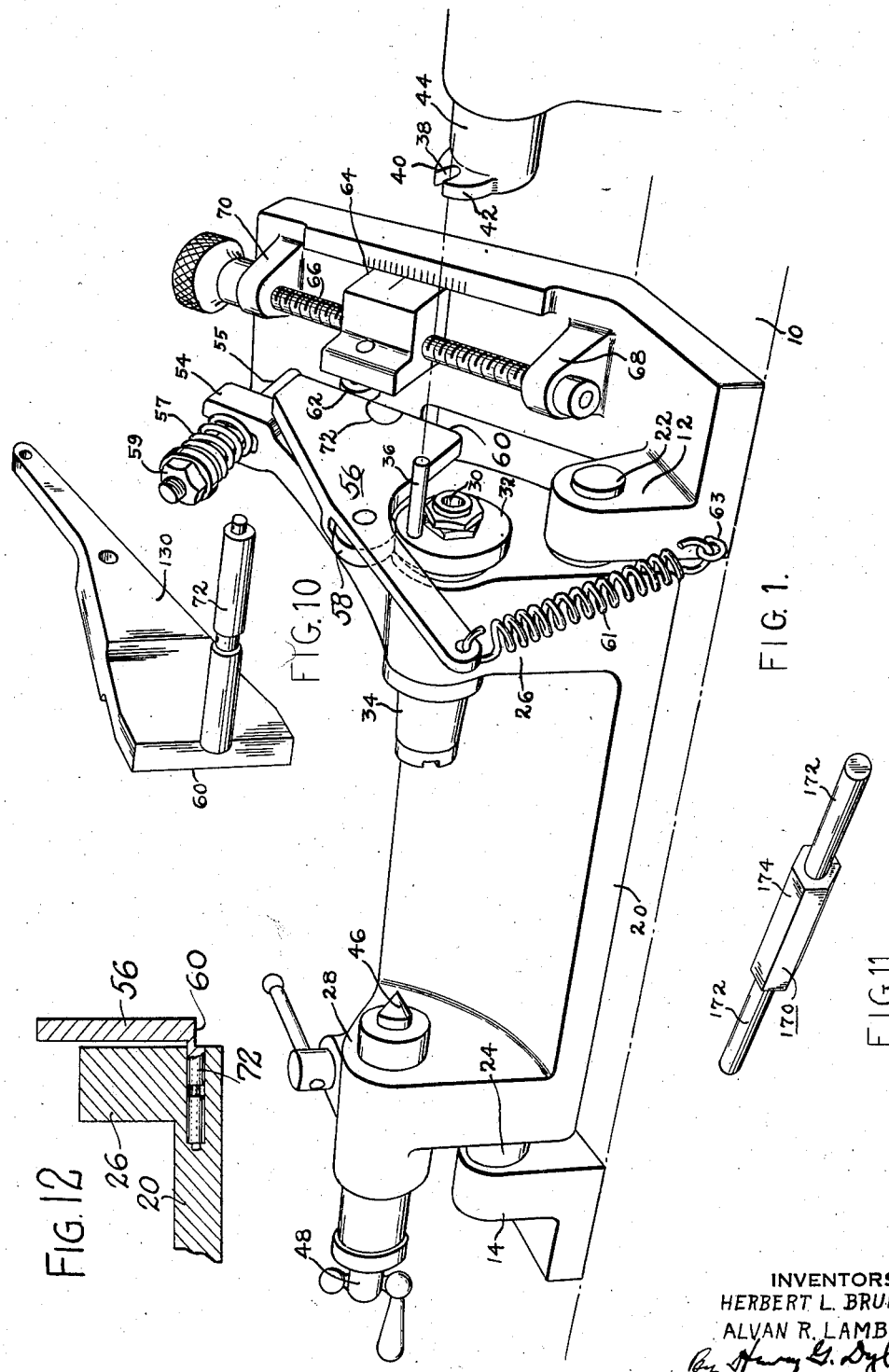

Whenever the fulcrum roller 62 is located above the pivot 72, as has been shown in Fig. 1, the spring 57 urges the cradle to rotate in a clockwise direction out of engagement with the grinding wheel and the cam positively actuates the cradle so as to force the work against the grinder 52. Thus, it may be seen that the cradle when the fulcrum roller is above the pivot 72 as shown in Fig. 1, is positively actuated into the direction approaching the grinding wheel, and resiliently therefrom. When the fulcrum roller 62 is below the pivot 72, as shown in Figs. 2, 3 and 4, the work is forced resiliently against the grinding wheel.

When the fulcrum roller is located above the pivot 72, as shown in Fig. 1, a reverse cam 32 is used, that is, the shape of the cam is the opposite to that of the work. When the fulcrum roller 62 is located below the pivot 72, as shown in Figs. 2, 3 and 4, the cam is shaped similar to the work, that is, a positive cam is used.

Referring to the disclosure in Fig. 4, the point of contact 82 of the grinder 52 to the work 50 lies above the center line connecting the center of rotation of the work and the center of rotation of the grinding wheel 52. That being the case, it is necessary for accurate reproduction to cause the cam follower 84 to contact the cam 32 ahead of the center line connecting the center of the cam surface 87 to the center of rotation of the cam 32.

In the modification disclosed in Fig. 4, this has been accomplished by providing an arcuate surface 87 for the cam follower 84. The ratio of the radius of curvature of the grinding wheel 52 to the minimum radius of the work piece is approximately equal to the ratio of the radius of curvature of the arcuate surface 87 to the minimum radius of the cam 32. By such an arrangement the point of contact 83 between the cams 32 and the cams 87 is displaced from the center line the same number of degrees as the point 82 is displaced from the corresponding center line. This results in the grinder and body having the same phase relation as the cam follower and the cam.

By referring to Fig. 7, the operation of the carriage, the work and the grinding wheel has been shown schematically. For the sake of argument, let it be assumed that the rough stock is circular and let it be assumed that the center 90 of rotation of the work piece 50 is directly above the pivotal center 22 of the cradle 20. As the work is reduced into a suitable shape 51, the carriage is tilted so that the new center 91 of the work piece 51 is offset from the center 22. The center of the work piece moves along an arcuate path indicated by the full line 90—91 shown in Fig. 7. When the operation is started upon the piece 50, the point of contact between the grinding wheel 52 and the work 50 lies on the center line 90—94, as shown in Fig. 7. After the body has been reduced, as shown by the reference character 51, a point of contact 95 is lower than the center line 90—94 shown in Fig. 7. At this time the point of contact lies beyond the center line 90—94 if the grinder rotates in the direction shown by the arrow in Fig. 7. In order to produce accurate results the cam follower 84 should be shifted so as to advance beyond the center line joining the center of rotation of the body 50 or the cam 32 and the center of curvature of the curved surface 87.

In the modification disclosed in Fig. 4, this has been accomplished by a link mechanism actuated by a rotation of the rocker arm 56. A link 98 has one end pivotally mounted at 100 to the bracket 12 and the other end pivotally mounted to a lever 102 having one end pivoted at 104 to the rocker arm 56. A depression of the cam 32 causes the cradle to swing in a counterclockwise direction, as does the rocker arm 56. This movement causes the link 106 pivotally connected to the link 102 and to the cam follower 84 to advance the cam follower 84 at a distance proportionate to the lowering of the cradle. By this means it is possible to have the cam follower 84 contact the cam 32 in a proper relation to compensate for the arcuate path of the center of curvature of the body, as the cradle 20 swings from one position to the other. The lever 102 is provided with a plurality of apertures permitting adjustment of the relative length.

Referring to Fig. 6, the rocker arm 56 and the cradle have been schematically shown. The apices of triangle a—b—c represent the effective triangle obtained by joining the center of rotation of the cam follower 58 to the pivot b connecting the rocker arm 56 to the cradle and the point of contact c of the fulcrum roller 62. As the cam follower 58 drops from the crest of the cam to a lower portion, the point b is raised to some point b' and the point a drops to some point a'. The pivot c remains substantially the same. In joining a'—b'—c, it can be readily seen that a—b substantially equals a'—b'; but b—c does not equal b'—c. That is, the effective distance between the pivot 72 and the fulcrum roller 62 varies, depending entirely upon the relative position of the parts. This change throws an error into the operation of the carriage in some conditions. In most cases, however, this error is imperceptible. The error may be compensated by mounting the fulcrum roller 110, as best seen in Fig. 4, in a block 112 having a dovetail engagement with the rocker arm 56 and actuated up and down by a screw 114 rotatably mounted in a pair of brackets 116 and 118 integral with the rocker arm 56. In this modification the distances a, b and c remain substantially constant, irrespective of the position of the rocker arm 56. The only way this ratio may be changed is by adjusting the screw 114, which raises or lowers the block 112.

The rocker arm 130 as disclosed in Fig. 10 includes a journal 72 normal with respect to the rocker arm and integral therewith. In each of the above modifications the journal is integral with the rocker arm. Furthermore, the race 60 extending along the bottom of the rocker arm intersects the center of the longitudinal axis of the journal 72. By this arrangement the most effective tilting or oscillation of the cradle is obtained. In other words, this arrangement results in a very effective operation of the rocker arm.

Furthermore, this arrangement permits the use of a neutral position where oscillatory movement of the rocker arm is not imparted to the cradle. This is accomplished by moving the fulcrum roller 62 or 110 to a position where the point of contact coincides with the axis of the rocker arm. Then the center of the journal 72 coincides with the point of contact between the fulcrum roller and the race of the rocker arm.

In the modification disclosed in Figs. 8 and 9, the cradle supports a cam follower or guide 140 supporting a cam follower 142 contacting the cam 32. The guide 140 is adjustably mounted upon the cradle 20, which adjustment will be more fully described later. The rocker arm 144 pivotally mounted at 146 and provided with a straight race 148 is provided with a detent 150 riding on top of the cam follower 142. As the cam 32 rotates, it actuates the cam follower 142 to cause the rocker arm 144 to oscillate about the fulcrum roller 62 which is adjustably mounted, as already described in connection with the other modifications.

Instead of mounting the cam follower in the end of the rocker arm, the cam follower 142, as best seen in Figs. 8 and 9, may be mounted upon the cradle 20. In order to accommodate the arcuate path of the cradle, the cam follower may be adjusted on the cradle. This adjustment has been accomplished by a cam 160 pivotally mounted upon the top of the cradle 20 and provided with an arm 162. The end of the arm 162, or some other point of the arm, is fixedly attached to the frame of the machine by a suitable link 163 so that the end of the arm 162 remains stationary while the cam 160 moves with the cradle, thus causing a slight oscillatory movement of the cam 160. This oscillatory movement of the cam 160 is utilized by actuating the guide 140 and the cam 142 so as to shift the angular point of contact of the cam 32 and the cam follower 142. The guide 140 is preferably provided with a dovetail connection upon the cradle 20. The guide is always urged against the cam 160 by the spring 161. The link 163 may be positioned in any selected hole in the arm 162 thus adjusting the movement of the cam 160.

If, for example, it is desirable to shape a body 170 shown in Fig. 11 where one or more portions 172 are round or cylindrical and another portion 174 is of varying shapes, as for example hexagon, the shaper may be set to form the irregular contoured portion 174 by properly adjusting the fulcrum roller 62 and providing a suitably contoured cam 32. After the portion 174 has been shaped, the fulcrum roller 62 may be adjusted so that the point of contact coincides with the center of the journal 72 or 146 as the case may be, which journal supports the rocker arm, in which event no movement will be produced in the cradle by deviations in the cam 32. That is, the movement of the cradle has then been reduced to zero. The cradle may then be locked in a suitable position so as to present the body to be shaped to the shaper so as to reduce the cylindrical portion 172 to the required diameter.

The method of producing the cam 32 will now be described. The stock from which the cam 32 is manufactured is placed in the shaper and constitutes the body to be shaped. A master cam is then used for actuating the rocker arm. For a particular setting of the fulcrum roller 62 the amplification of deviations of the body shaped with respect to the deviations on the cam may be represented by N, that is, the deviations on the cam being N times the deviations on the body to be shaped. The deviations on the master cam in producing the cam will then be $N^2$ times the deviations on the body to be shaped by the cam being produced. For example, it is possible to use an amplification factor of ten, that is, the deviations on the cam used in shaping the body being ten times the deviations found in the shaped body. For the same setting, the deviations on the master cam may be ten times that of the cam being produced. Consequently, the deviations on the master cam will be one hundred times the deviations on the body to be shaped. This permits of cheap manufacture of the master cam. The tolerance may be comparatively large, as the tolerance on the finished body will be only one one-hundredth of that of the master cam. Supposing the tolerance on the finished article is one ten-thousandths of an inch, the tolerance then on the master cam would be one one-hundredth of an inch. It is very easy for any mechanic to produce a cam having such a tremendous tolerance.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described our invention, we claim:

1. A device for shaping a work body including a tool shaper and means for causing a relative movement between the body and the shaper, said means including an oscillatory cradle, a rocker arm for the cradle, said rocker arm being pivotally attached thereto in eccentric relation with respect to the axis of oscillation of the cradle, a cam follower carried upon the rocker arm for engagement with a cam rotating in synchronism with the body to be shaped, said cam causing the rocker arm to oscillate about its pivot, and an adjustable fulcrum mounted for adjustment on either side of the pivot between the rocker arm and the cradle, the fulcrum when on one side of the pivot causing the body to be shaped similar to the contour of the cam and when on the other side of the pivot causing the shape of the body to be in reverse relation to the shape of the cam.

2. A device for shaping a work body, including a rotary tool shaper, means for rotating the body and feeding means for causing a relative movement between the body and the shaper, said feeding means including a cradle mounted for oscillatory movement, a rocker arm pivotally mounted upon the cradle in offset relation with respect to the axis of oscillation of the cradle, said rocker arm having one side mounted upon an adjustable fulcrum adjustable to either side of the pivotal mounting, a cam follower mounted upon the rocker arm for engagement with a cam rotating in synchronism with the body to be shaped, the contour of the cam determining the relative movement between the shaper and the body to be shaped, resilient means for rotating the rocker arm to cause the cradle to oscillate in one direction when the fulcrum is located on either side of the pivot, and in the opposite direction when the fulcrum is located on the other side of the pivot, and resilient means engaging the cradle for biasing the cradle in one direction irrespective of the position of the fulcrum.

3. A device for shaping a work body member including a rotary tool shaper member and means for causing a relative movement between the shaper member and the body member, said means including an oscillatory cradle for rotatably supporting one of said members, a rocker arm pivotally mounted upon the cradle for oscillating the same, one end of the rocker arm being actuated by a cam follower actuated by a cam rotating in synchronism with the body to be shaped, a side of the rocker arm resting upon a rotary fulcrum roller, and means for adjusting the fulcrum roller to change the magnitude and direction of the swinging movement of the cradle actuated by the rocker arm.

4. A device for shaping a work body member including a rotary grinding wheel member for shaping the body, and means for causing a relative movement between said members, said means including an oscillatory cradle in which one of said members is supported, a rocker arm for actuating the cradle pivotally mounted thereto, one end of the rocker arm having a cam follower actuated by a cam rotating in synchronism with the body to be shaped, one side of the rocker arm resting upon a fulcrum roller, and means for adjusting the fulcrum roller so as to cause the rocker arm to function as a lever of the first class when the fulcrum roller is in one position and as a lever of the second class when the fulcrum roller is in another position.

5. A device for shaping a work body including a cylindrical tool shaper and means for feeding the body to and from the cylindrical shaper, said means including an oscillatory cradle, a rocker arm for oscillating the cradle pivotally mounted thereto, one end of the rocker arm having a cam follower actuated by a cam rotating in synchronism with the body to be shaped, one side of the rocker arm adjustably supporting a fulcrum roller, the adjustment of the fulcrum roller from one position to the other shifting the rocker arm from a lever of the first class to a lever of the second class to thereby change the direction of oscillation of the cradle.

6. A device for shaping a work body including a cylindrical tool shaper, means for presenting the body to the shaper, said means including a cradle pivotally mounted for rotatably supporting the body and actuating means for oscillating the cradle about said pivotal mounting, said actuating means including a rocker arm, a cam rotating in synchronism with the body to be shaped, a cam follower carried by the rocker arm, means cooperating with the cam and the cam follower for oscillating the rocker arm to thereby oscillate the cradle causing the body to be shaped to travel through an arcuate path, and compensating means for shifting the cam follower with respect to the rocker arm in response to the movement thereof so as to cause the cam follower to have a relative movement with respect to the cam to compensate for the arcuate path of the body.

7. A device for shaping a work body including a cylindrical tool shaper and means for presenting the body to the shaper, said means including a cradle pivotally mounted for rotatably supporting the body and actuating means for oscillating the cradle about the pivot thereof so as to actuate the body along an arcuate path toward and away from the shaper, said actuating means including a cam rotating in synchronism with the body to be shaped, a cam follower, means for interconnecting the cam follower to the cradle causing the cradle to oscillate as the cam follower is actuated by the cam, and compensating means for shifting the cam follower relative to the cam so as to compensate for the arcuate path of the body to be shaped.

8. A device for shaping a work body including a rotary tool shaper and means for presenting the body to the shaper, said means including a cradle pivotally mounted for rotatably supporting the body and actuating means for oscillating the cradle about its pivot so as to cause the body to be actuated towards and away from the shaper along an arcuate path, said actuating means including a cam rotating in synchronism with the body to be shaped, a cam follower actuated by the cam, means for interconnecting the cam follower to the cradle so as to cause the cradle to oscillate as the cam follower is actuated by the cam, and compensating means for shifting the relative angular position of the cam follower with respect to the cam to compensate for the arcuate path of the body.

9. A device for shaping a work body including a rotary tool shaper and means for presenting the body to the shaper, said means including a cradle pivotally mounted for rotatably supporting the body and actuating means for oscillating the cradle about said pivot causing the body to be actuated through an arcuate path towards and away from the shaper, said actuating means including a cam rotating in synchronism with the body to be shaped, a cam follower having an arcuate surface actuated by the cam, the ratio of the radius of curvature of the rotary shaper to a transverse dimension of the body being substantially equal to the ratio between the radius of curvature of the arcuate surface of the cam follower and a corresponding transverse dimension of the cam, means for interconnecting the cam follower to the cradle so as to cause the cradle to be actuated by the cam through the cam follower, and compensating means for shifting the angular position of the cam follower with respect to the cam so as to compensate for the curvature of the arcuate path through which the body travels.

10. A device for shaping a work body including a rotary tool shaper and means for presenting the body to the shaper, said means including a pivotally mounted cradle for rotatably supporting the body to be shaped, and means for actuating the cradle, said actuating means including a cam rotating in synchronism with the body to be shaped, a cam follower actuated by the cam, said cam follower having an arcuate surface, the ratio of the radius of curvature of the rotary shaper to a transverse dimension of the body to be shaped being substantially equal to the ratio of the radius of curvature of the cam follower to a corresponding transverse dimension of the cam, a rocker arm pivotally mounted to the cradle for supporting the cam follower, said rocker arm supporting a fulcrum roller movable along an inclined plane, the cam actuating the cam follower causing the rocker arm to actuate the fulcrum roller along the inclined plane to thereby oscillate the cradle so as to present the body to the shaper according to the contour of the cam.

11. A device for shaping a work body including a rotary tool shaper and means for presenting the body to the shaper, said means including a pivotally mounted cradle for rotatably supporting the body, resilient means urging said cradle in one direction, a cam rotating in synchronism with the body to be shaped, a cam follower having an arcuate surface actuated by the cam, the ratio of the radius of curvature of the shaper to a transverse dimension of the shaped body being substantially equal to the ratio of the radius of curvature of the cam follower to a corresponding transverse dimension of the cam, a rocker arm for supporting the cam follower, said rocker arm being pivotally mounted to the cradle, a race, and a fulcrum roller cooperating with the race for supporting the rocker arm, the cam actuating the cam follower causing the rocker arm to oscillate the cradle.

12. In a device of the character described, a frame having a plane surface, a cradle pivotally mounted in the frame for oscillatory movement, means for oscillating the cradle, said means including a cam, a cam follower actuated by the cam, a rocker arm pivotally attached to the cradle in offset relation with respect to its pivot, said rocker arm supporting the cam follower, a fulcrum roller adjustably mounted in one side of the rocker arm, said fulcrum roller resting upon the plane surface so that as the cam follower actuates the rocker arm about its pivot the fulcrum roller is actuated against the plane surface thereby causing the cradle to oscillate, and means accessible from the exterior of the rocker arm for adjusting the fulcrum roller so as to change the magnitude of the swing of the rocker arm thereby changing the degree of oscillation of the cradle.

13. A device for shaping a work body including a rotary tool shaper, means for presenting the body to the shaper, said means including an oscillatory cradle, said cradle including a bearing the axis of which is parallel to the axis of oscillation of the cradle, a rocker arm including a journal normally disposed with respect to the rocker arm, said journal being rotatably mounted in the bearing of the cradle, said rocker arm having a straight race passing through the center of the pivot, a fulcrum roller adjustably mounted for engagement with the race, and means for rocking the arm upon the fulcrum roller so as to oscillate the cradle.

14. A device for shaping a work body including a cylindrical tool shaper and means for causing a relative movement between the shaper and the body, said means including an oscillatory cradle, said cradle including a bearing the longitudinal axis of which is parallel to the axis of oscillation of the cradle, a rocker arm including a journal extending normal thereto mounted in the bearing, a fulcrum roller upon which the rocker arm rests, a straight race for the fulcrum roller, said race intersecting the longitudinal center of the journal, and means for rocking the rocker arm upon the fulcrum roller to oscillate the cradle.

15. A device for shaping a work body member including a cylindrical tool shaper member and means for causing a relative movement between the shaper member and the body member, said means including an oscillatory cradle rotatably supporting one of said members, a rocker arm, means for pivotally mounting the rocker arm upon the cradle, a fulcrum roller upon which the rocker arm rests, a straight race for the fulcrum roller, said race intersecting the longitudinal center of the pivot, and means for actuating the rocker arm upon the fulcrum roller to thereby oscillate the cradle.

16. A device for shaping a work body including a cylindrical tool shaper and means for causing a relative movement between the shaper and the body, said means including an oscillatory cradle for supporting the body, a rocker arm pivotally mounted upon the cradle, said rocker arm resting upon a fulcrum roller, a race for the fulcrum roller intersecting the pivot of the rocker arm, a cam rotating in synchronism with the body to be shaped, a cam follower actuated by the cam, a guide mounted upon the cradle for supporting the cam follower, said cam follower actuating the rocker arm, and means for shifting the relative position of the cam follower to compensate for the arcuate path of the body carried by the cradle.

17. A device for shaping a work body including a cylindrical tool shaper and means for causing a relative movement between the shaper and the body, said means including an oscillatory cradle for rotatably supporting the body to be shaped, means for actuating the cradle, said means including a cam rotating in synchronism with the body to be shaped, a cam follower adjustably mounted upon the cradle, means responding to the relative movement between the shaper and the body for adjusting the cam follower upon the cradle, and means actuated by the cam follower for causing the cradle to oscillate as the cam follower is actuated by the cam.

18. A device for shaping a work body including a cylindrical tool shaper and means for causing a relative movement between the shaper and the body, said means including an oscillatory cradle for rotatably supporting the body to be shaped actuated through an arcuate path, means for oscillating the cradle, said means including a cam rotating in synchronism with the body to be shaped, a cam follower adjustably supported upon the cradle, means for interconnecting the cam follower to the cradle so as to cause the cradle to rock as the cam follower is actuated by the cam, and compensating means for adjusting the cam follower relative to the cradle as the cradle rocks so as to change the angular point of contact between the cam and the cam follower to compensate for the arcuate path of the work body.

19. A device for shaping a work body including a cylindrical tool shaper, means for causing a relative movement between the shaper and the body, said means including an oscillatory cradle for rotatably supporting the body, actuating means for oscillating the cradle, said actuating means including a cam, a cam follower mounted upon the cradle, and means for shifting the cam follower upon the cradle to compensate for the arcuate path of movement of the body to be shaped.

20. A device for shaping a work body including a cylindrical tool shaper, means for causing a relative movement between the shaper and the body, said means including an oscillatory cradle for rotatably supporting the body, actuating means for oscillating the cradle, said actuating means including a cam, a cam follower mounted upon the cradle, and means for shifting the cam follower upon the cradle to compensate for the arcuate path of movement of the body to be shaped, said shifting means including a cam mounted for rotation upon the cradle and actuated by the movement thereof so that the cam follower is shifted according to the movement of the cradle.

21. A device for shaping a work body including a cylindrical tool shaper, means for causing a relative movement between the shaper and the body, said means including an oscillatory cradle for rotatably supporting the body to be shaped actuated through an arcuate path, actuating means for oscillating the cradle, said actuating means including a cam and a cam follower adjustably mounted, a second cam having a movement in response to the movement of the cradle for shifting the cam follower with respect to the cam so as to cause the cam follower to compensate for the arcuate path through which the body to be shaped is actuated.

22. A device for shaping a work body member including a cylindrical tool shaper member and means for causing a relative movement between the shaper member and the body member, said means including an oscillatory cradle supporting one of said members, a rocker arm pivotally mounted upon the cradle for actuating the same, one end of the rocker arm having a cam follower actuated by a cam rotating in synchronism with the body to be shaped, another side of the rocker arm moving upon a stationary fulcrum, and compensating means responding to the relative movement of the shaper member and the body member for adjusting the distance from the pivot of the rocker arm to the cam follower to shift the cam follower to compensate for the arcuate path of the cradle.

HERBERT L. BRUMP.
ALVAN R. LAMBERT.